Patented Feb. 18, 1936

2,031,308

UNITED STATES PATENT OFFICE 2,031,308

BED MATERIAL FOR FLOWER BULBS

John J. Grullemans, Painesville, Ohio, assignor to The Wayside Gardens Company, Mentor, Ohio, a corporation of Ohio No Drawing. Application December 30, 1933, Serial No. 704,755

3 Claims. (Cl. 71—9)

The object of this invention is to provide bed material particularly suitable for growing or forcing flower bulbs indoors, which may be made of ingredients comparatively cheap to obtain, easy to handle, capable of being conveniently and economically shipped because of being comparatively light in weight.

More specific objects are to provide a material which will nourish the plant, protect the roots, avoiding subjecting them to temperature changes, and to greatly increase the range of bulb plants that may be grown indoors over those now commonly grown with pebbles and water or gravel and water.

I term my product a bulb fibre and the following specification will give the approximate ingredients and the preferred proportions.

Further advantages appear in the following description and it is desired not to limit the scope of the present invention beyond that defined in the appended claims, it being understood that variations in the proportions and order of mixing the materials may be varied without departing from the spirit of the present invention.

It is well known that narcissus bulbs are commonly grown in a shallow bed of pebbles or gravel with water. Many bulbous plants however cannot be successfully so grown, and I find that by using the following composition, a wide variety of bulbous plants may be grown and their growth may be forced most satisfactorily.

Even though some bulbs such as narcissus bulbs grow in water and pebbles, various difficulties are encountered such as exposed roots, the roots dislocating the pebbles by forcing the bulbs out of the water and the like, interfering with uniformly successful growth. The composition of the present invention eliminates these difficulties and, as stated, permits the growth of a wide variety of bulbs, and it is composed of a fibrous bed of ground or otherwise finely divided peat, a lime-like substance, for example, ground shell such as oyster shells, and a sweeting material such as charcoal.

The peat is preferably ground in a dry condition, although it may be ground while somewhat moist. This is done by any suitable machine, reducing it to rather finely divided particles such as fibres. Such machines are in common use for grinding of such material. The shells are ground in small particles to say, one-fourth inch or less in size. This size is said to produce satisfactory results, although the shell may be ground more finely if desired. The charcoal may be in granulated or powdered form.

The preferred proportions are, for example, one bushel of the peat, ten pounds of the shell, two pounds of the charcoal, ground or divided as above described.

The weight of the peat varies considerably; because of the moisture conditions and in the bulk, we have given the peat by measurement volume rather than by weight. The ground shell and granulated or powdered charcoal is most easily measured by weight.

The mixture in the proportions named thoroughly intermingled may be used for the root beds by placing the bulb therein to the proper depths, depending upon the character of the bulb, as is well known to florists and growers of bulbous plants. Preferably the material is thoroughly saturated with water and is thereafter kept in a moist condition during growth of the plant.

Specifically such a material has an advantage over gravel or pebbles in that the roots thrown out from the bulb are kept protected, which is very essential to growing indoors of bulbous plants and securing the most perfect results. This protection as above indicated is not possible with pebbles or gravel.

Incidental to the protection this material insulates the roots against temperature changes much more effectively than if they were growing in gravel and water or pebbles and water.

Another important advantage is that this combination furnishes the plant with food values in peat, charcoal and shells, providing an ideal combination of materials, promoting the root growth obviously not furnished in a water and gravel bed.

As above stated, a wide range of bulbous plants may be grown which it is well known cannot be grown with pebbles.

Another practical advantage is the convenience in treating of the materials, convenience in preparation and handling, the convenience in shipment, of low transportation cost as compared to the much greater weight of gravel and pebbles.

I wish it to be understood that my plant fibre or bed material made in accordance with the foregoing specification is particularly suitable for flower bulbs which may be desired to be grown or be forced indoors in the house or private conservatory.

Having thus described my invention, what I claim is:

1. The material of the character described, consisting of ground or divided peat, broken divided shell material and powdered charcoal in the following proportions:—peat 1 bushel, shell— 10 pounds, and charcoal—2 pounds.

2. A material adapted for use as a bed material for stimulated growth of bulbous flowering plants, the material consisting of an intimate mixture of a quantity of finely divided peat, and relatively small quantities of ground calcium carbonate and powdered or granulated charcoal.

3. A material of the character described, consisting of ground or divided peat, broken or divided material composed principally of calcium carbonate, and powdered or granulated charcoal in the following proportions:—peat—1 bushel, calcium carbonate material—10 pounds, charcoal—2 pounds.

JOHN J. GRULLEMANS.